Aug. 26, 1952      G. J. KROMER      2,608,274
ANTISKID ATTACHMENT
Filed Feb. 27, 1950
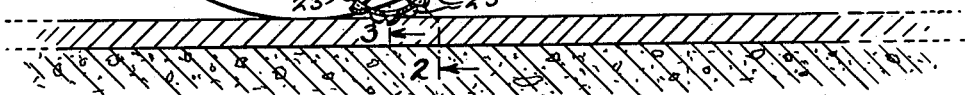
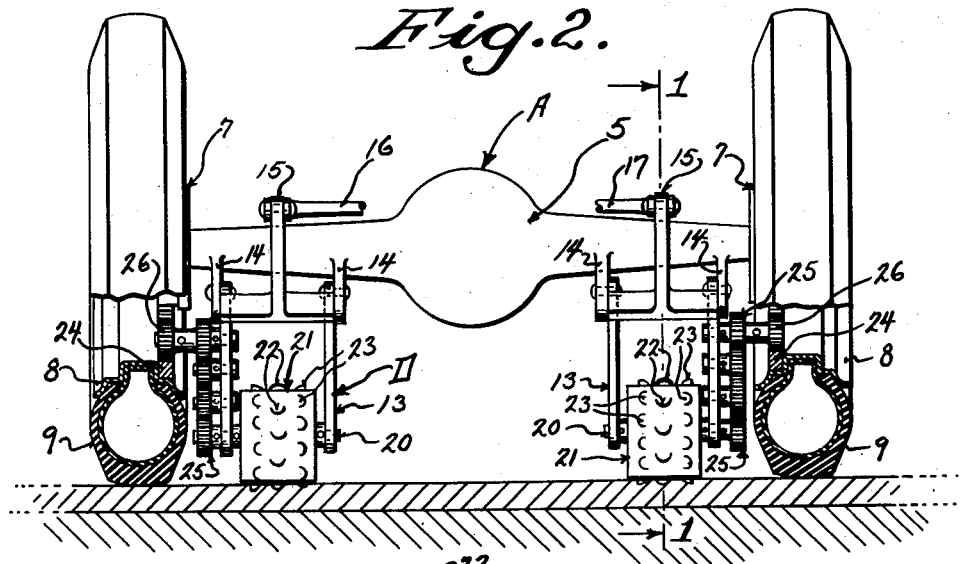
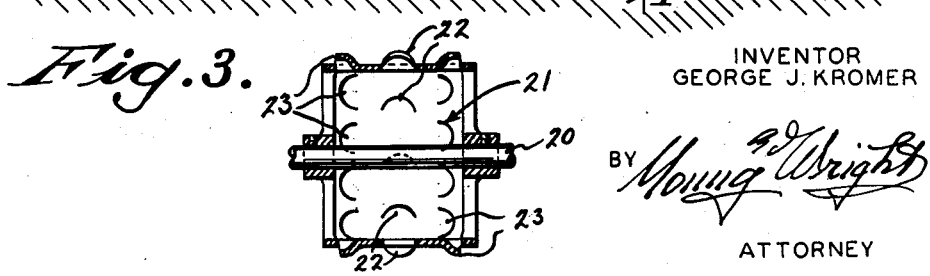
INVENTOR
GEORGE J. KROMER
BY *Young Wright*
ATTORNEY Patented Aug. 26, 1952

2,608,274

UNITED STATES PATENT OFFICE 2,608,274

ANTISKID ATTACHMENT

George J. Kromer, Milwaukee, Wis.

Application February 27, 1950, Serial No. 146,440

1 Claim. (Cl. 188—5)

This invention appertains to motor vehicles, and more particularly to a novel anti-skid attachment therefor.

One of the primary objects of my invention is to provide means under the control of a driver of an automobile for effectively engaging snow or ice upon a slippery street or road in case of an emergency, to prevent lateral and forward skid of the automobile.

Another salient object of my invention is to provide means, controlled by a lever, movable into and out of engagement with snow or ice embodying novel shoes, cylinders or wheels, having lugs, spurs or the like arranged in a novel fashion for biting engagement with snow and ice for preventing side and forward skid or a combination thereof.

A further important object of my invention is to provide means whereby the cylinders or wheels when lowered into engagement with the snow or ice will be driven by the rear wheels of the automobile in a reverse direction from said wheels for checking forward movement or skid of the automobile.

A still further object of my invention is to provide a novel and simple means for mounting the device on an automobile as an attachment therefor.

With these and other objects in view, the invention consists in the novel construction, arrangement and formation of parts, as will be hereinafter more specifically described and claimed, and illustrated in the accompanying drawing, in which drawing, Figure 1 is a fragmentary longitudinal sectional view through an automobile equipped with my novel anti-skid device, the cylinders or wheels being shown in full lines in their operative position and in dotted lines in their raised inoperative position, the section being taken on the line 1—1 of Figure 2.

Figure 2 is a fragmentary transverse sectional view through the rear end of an automobile showing my novel device, the section being taken on the line 2—2 of Figure 1.

Figure 3 is a detail sectional view through one of the novel cylinders or wheels for engaging snow and ice.

Figure 4 is a detail longitudinal sectional view through a shoe for engaging the snow or ice in lieu of cylinders.

Figure 5 is a bottom plan view of the shoe illustrating the novel arrangement of the spurs or lugs.

Referring to the drawing in detail, wherein similar reference characters designate corresponding parts throughout the several views, the letter D generally indicates my anti-skid device for an automobile or truck A. As the automobile or truck A is of the common type now in general use, only sufficient parts have been illustrated to show the use of my device D. As shown, the automobile or truck A includes the rear differential and axle housing 5, from which protrude the driven stub axles 6 having keyed or otherwise secured thereto rear ground drive wheels 7. The wheels 7 include rims 8 for tires 9. Floorboards 10 are also illustrated and the same can be provided with a slot 11 for the provision of a hand lever 12, which forms a part of my invention and which will be later described.

My device D includes substantially U-shaped yokes 13, mounted for swinging movement on ears 14, which can be welded, or otherwise fastened to the differential and axle housing 5. The upper ends of the yokes 13 have formed thereon arms 15 and the arms are pivotally connected to links 16 and 17. The links 16 and 17 extend forwardly of the car and are in turn pivotally connected to the lower end of the lever 12. The lever 12 can be held in either one of its two positions by means of a finger operated dog 18 and sector rack 19. By operating the lever yokes 13 can be raised and lowered.

In accordance with the invention the outer lower ends of the yokes 13 rotatably carry axles or shaft 20 to which are firmly secured my novel cylinders or wheels 21. The cylinders 21 can have struck out therefrom an annular central row of biting teeth, studs, lugs or the like 22, and these teeth extend circumferentially around the drum and project toward the front of the vehicle. Also struck from each cylinder 21 are side annular rows of biting teeth 23 and these teeth face toward the sides of the cylinders and constitute means for biting in snow and ice to prevent lateral skid. The teeth 22 biting into the ice or snow will prevent forward skid.

It is also an important feature of the invention to provide means for driving the wheels or cylinders 21 in a reverse direction from the forward rotation of the automobile wheels 7, and I accomplish this by rigidly securing to the inner faces of the wheel rims 8, ring gears 24. Rotatably mounted upon each yoke 13 is a train of inter-meshing spur gears 25 and the innermost spur gear of the train has formed thereon a hub or the like, to which is secured for movement therewith a drive spur gear 26. When the yokes 13 are moved to a lowered position by the lever 12 to engage the cylinders or wheels 21 with the ground the spur gears 26 mesh with the ring gears 24 and the train of gearing is such that said cylinders will rotate in a reverse direction from the wheels 7. Consequently, the cylinders tend to stop the forward motion of the automobile and to prevent forward skid and function as a brake for the automobile without the necessity of applying the ordinary vehicle brakes which tend to increase skid.

Obviously, when streets are clear the lever 12 is actuated to raise the cylinders 21 above the ground and in the position shown in dotted lines in Figure 1. In case of emergency, the lever 12 is pulled rearwardly which will immediately bring the cylinders and the snow and ice into proper engagement.

In lieu of cylinders 21 I can utilize shoes 27. The shoes have formed on their side edges upstanding lugs 28, which can be pivotally connected to the arms of the yokes 13. Obviously, where shoes 27 are utilized, the train of gearing 25 is eliminated.

The shoes 27 are provided with the same novel types of teeth, spurs or lugs, that are utilized on the cylinders 21. Hence each shoe 27 is provided with a longitudinal row of struck out teeth 29. These teeth project forwardly and downwardly and any snow or ice shaved off by the teeth will slide through the openings 30 left by the striking down of the teeth. On opposite sides of the central row of teeth 29 are side rows of teeth 31 and these teeth are also struck out from the metal forming the body of the shoe. The teeth 31 project in opposite directions and dig into the snow or ice to prevent lateral skid.

By operating the hand lever 12 the cylinders or the shoes can be brought down into engagement with the snow or ice with the desired pressure.

Changes in details may be made without departing from the spirit or the scope of this invention but what I claim as new is:

In an automobile including a drive axle housing and drive ground wheels, of an anti-skid attachment for the automobile including ring gears secured to said wheels, yokes rockably mounted on the axle housing adjacent to said wheels and at one side of the axis of the ring gears, means connecting said yokes together for synchronous movement, shafts rotatably carried by the outer ends of the yokes, cylinders having ground engaging teeth mounted upon said shafts for rotation therewith, means for rocking the yokes for raising and lowering the cylinders into and out of ground engaging position, spur gears rotatably carried by the yokes adjacent to their inner ends movable into meshing engagement with the ring gears when the cylinders are in their lowered operative position, and a train of gearing carried by the yokes operatively connected to the spur gears and to the shafts.

GEORGE J. KROMER.

REFERENCES CITED

The following references are of record in the file of this patent:

UNITED STATES PATENTS

| Number | Name | Date |
|---|---|---|
| 894,377 | Filler | July 28, 1908 |
| 912,759 | Todd | Feb. 16, 1909 |
| 1,224,367 | Duffie | May 1, 1917 |
| 1,521,705 | Norman, Jr. | Jan. 6, 1925 |
| 1,539,476 | Gormly | May 26, 1925 |

FOREIGN PATENTS

| Number | Country | Date |
|---|---|---|
| 251,057 | England | Apr. 29, 1926 |